Patented June 7, 1938

2,119,739

UNITED STATES PATENT OFFICE 2,119,739

ACIDOPHILUS PRODUCT AND METHOD OF MAKING IT

Stewart M. Farr, Genesee Depot, Wis.

No Drawing. Application February 10, 1937, Serial No. 125,073

3 Claims. (Cl. 167—73)

The invention relates to acidophilus products and to methods of producing the same.

B. acidophilus are of recognized therapeutic value when implanted and allowed to proliferate in the human intestine. In my prior Patents No. 1,851,165 of March 29, 1932, and No. 1,985,490 of December 25, 1934, I have disclosed certain processes for making acidophilus products. In these processes the B. acidophilus are contained in the curd and the products produced contain a relatively large percentage of curd. The inclusion of the curd in the product offers certain difficulties in that it may affect the flavor and the degree of possible concentration of B. acidophilus is also limited. After considerable experimenting, I have found that B. acidophilus may be separated from the curd and obtained as a concentrated bacterial mass and that the cost of obtaining the concentrated product is lower than with prior processes and results in a product many times more potent than those heretofore obtained.

The keeping of products containing B. acidophilus has presented a problem, and the present invention also deals with a simple and effective method for preserving the viability of such products.

In the making of my improved B. acidophilus concentrate I preferably grow the bacillus in milk, and for this purpose I heat skim milk in a tank equipped with suitable agitating mechanism to 210° F. and hold this temperature for one and one-half hours so as to substantially completely sterilize the milk. If the tank is built for pressure, the milk may be heated to 220° F. and held for one hour or to 250° F. and held for one-half hour. Thereafter the casein is precipitated out of the milk solution by the addition of a suitable reagent such as calcium chloride, calcium lactate, or calcium acetate, or hydrochloric acid may be used, but the first named salts are preferred, and of these calcium chloride is very well suited for the purpose. The precipitating salt solution is prepared by mixing 500 grams of the salt with enough water to make 1000 cc. of solution. In the case of the salt each cc. of this solution will contain ½ gram of the salt. At the end of the one and one-half hour heating period if the temperature of the milk has dropped, it is brought back to 210° F., and the agitator in this heated milk is then started and brought to moderately high speed and about 130 cc. of the precipitating salt solution to each ten gallons of milk is slowly added to the heated milk. As an alternative the reagent or precipitant may be added to the milk before sterilizing. A firm, hard, or granular precipitate of casein is obtained which is not greatly affected by the time of adding the precipitant just so long as the precipitant is in the milk at the time of maximum temperature. Moderately violent agitation at high temperature is desirable to produce the granular precipitate. After a short time, for example five minutes, the contents of the tank are cooled by suitable apparatus down to 100° F.

A suitable culture of B. acidophilus is then added to the contents of the tank while stirring or agitating the same and then the stirring is stopped and the contents allowed to incubate for about twenty hours. Then the contents of the tank are thoroughly stirred or agitated so that the whey and precipitated casein are thoroughly mixed. This treatment has the effect of dislodging a large percentage of the B. acidophilus that may be on the curd or casein precipitate from the same and putting them into the whey and results in a greater concentration of bacteria, gram per gram in the whey than in the casein and is made possible by the precipitation and hardening of the casein before incubation of the bacteria in the milk mixture. The mixture is then drawn off of the tank while agitator is running through relatively fine mesh screens, the liquid content running off from the top and the residue remaining on the screens being the greater proportion of the precipitated casein or curd so that the whey is separated from the casein without running through the casein. This curd is not waste but may be used for animals such as dogs, foxes, and sick calves.

The particular mesh of a screen will depend on the purpose for which the concentrate of B. acidophilus is to be used. If the concentrate is for ingestion without modification, or is to be added to a semi-solid substance such as cheese, a 30 mesh screen is satisfactory. If, however, the concentrate is for suspension in a liquid medium, as milk or fruit juice, it may be desirable to use a finer screen. The fineness of the screen used to separate the casein from the whey will determine the volume of casein in the concentrate, and thereby effect to the extent of that volume, the concentration of bacteria.

The screened liquid contains the B. acidophilus from which the concentrate is made, and the B. acidophilus bacteria may be separated therefrom by an ordinary cream separator, the liquid preferably being warmed to about 90° F. for the separation step and passed through the separator slowly. During this operation the whey is discharged from the separator and may be used as feed while the bacteria remain in the bowl of the separator and are scraped out after it has been stopped. The yield of concentrate varies with the concentration of bacteria in the mixture separated. Roughly, the yield is one ounce per gallon of milk, and the concentration of bacteria of this mass will run to six thousand billion per ounce, or two hundred billion per gram. The concentrate as taken from the separator bowl is a pasty dough, somewhat lumpy and sour. It may be used in the condition that it comes from the bowl or it may be given special preparation depending upon the purpose for which it is to be used.

For introduction of the concentrate into soft cheese, as neufchatel or cream, the bacterial mass is treated to reduce any large lumps and then neutralized to approximately pH 6.6 with magnesium oxide or any other suitable alkali such as sodium hydroxide, potassium hydroxide, calcium oxide. The consistency of the concentrate may approximate that of heavy cream, and acidophilus milk is added, if necessary, to thin it out. When brought to the proper consistency, it may be homogenized in any suitable homogenizing apparatus. In a cheese product, enough of the concentrate is added to bring the viable count of B. acidophilus in the cheese to from 200 to 500 billion per ounce.

This concentrate may be incorporated or suitably mixed with sweet milk for beverage purposes and in proportions to bring the B. acidophilus content of the sweet milk sufficiently high so that it can be used for therapeutic purposes. At the present time it is recognized that the viable B. acidophilus milk should not be below one hundred (100) million per cc. It then would require one-half a gram of this concentrate per quart of sweet milk to give the desired bacterial content.

The concentrate may be incorporated as above described in beverages other than sweet milk, for example orange juice or beer. The concentrate may also be dried and coated with a suitable coating to form a tablet or a pill.

It is known that many bacteria may be kept alive for a long period of time by drying them and holding them in a vacuum. According to the present invention in order to maintain the viability of the B. acidophilus concentrate, I may dry the same in a relatively high vacuum and while subjected to this vacuum give it an air impervious coating such as commonly known as enteric coat which is insoluble in acid but soluble in neutral or alkalin solutions, so that the article coated therewith may pass through the stomach without being exposed to the stomach acid but will release the bacteria in the intestine. Or the concentrate when dried may be sealed up in an ampule while under vacuum and distributed in this form of package.

I desire it to be understood that this invention is not to be limited to specific details heretofore described except in so far as such limitations are included in the claims.

What I claim as my invention is:

1. The method of producing a B. acidophilus concentrate comprising precipitating casein from a substantially sterile heated milk solution, cooling the mixture to about body temperature, inoculating the cooled mixture with a suitable culture of B. acidophilus and allowing incubation to proceed therein, then agitating the mixture to free B. acidophilus from the precipitate, separating the greater portion of the precipitate from the mixture, and then separating the greater portion of the B. acidophilus from the liquid to form a mass of B. acidophilus.

2. The method of producing a B. acidophilus concentrate comprising precipitating casein from a substantially sterile heated milk solution, cooling the mixture to about body temperature, inoculating the mixture with a suitable culture of B. acidophilus and allowing incubation to proceed therein, then agitating the mixture to free B. acidophilus from the precipitate, separating the greater portion of the precipitate from the mixture, and centrifuging the separated liquid portion of the mixture to obtain a mass of B. acidophilus.

3. The method of producing a B. acidophilus concentrate comprising precipitating casein from a substantially sterile heated milk solution, cooling the mixture to about body temperature, inoculating the mixture with a suitable culture of B. acidophilus and allowing incubation to proceed therein, agitating the mixture to free B. acidophilus from the precipitate, separating the liquid from the precipitate, centrifuging the liquid to obtain a bacteria containing mass, neutralizing this mass to pH 6.6 and homogenizing the neutralized mass to a creamy consistency.

STEWART M. FARR.